United States Patent
Mukherjee et al.

(10) Patent No.: US 12,043,795 B2
(45) Date of Patent: Jul. 23, 2024

(54) ENHANCED OIL RECOVERY METHODS AND COMPOSITIONS

(71) Applicant: Dow Global Technologies LLC, Midland, MI (US)

(72) Inventors: Biplab Mukherjee, Pearland, TX (US); Roxanne M. Jenkins, Missouri City, TX (US); Matthew E. Crosley, Clute, TX (US); Troy E. Knight, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/767,527

(22) PCT Filed: Oct. 8, 2020

(86) PCT No.: PCT/US2020/054731
§ 371 (c)(1),
(2) Date: Apr. 8, 2022

(87) PCT Pub. No.: WO2021/072043
PCT Pub. Date: Apr. 15, 2021

(65) Prior Publication Data
US 2024/0093085 A1 Mar. 21, 2024

Related U.S. Application Data

(60) Provisional application No. 62/913,222, filed on Oct. 10, 2019.

(51) Int. Cl.
*E21B 43/34* (2006.01)
*C09K 8/584* (2006.01)
*C09K 8/592* (2006.01)
*E21B 43/24* (2006.01)

(52) U.S. Cl.
CPC .............. *C09K 8/592* (2013.01); *C09K 8/584* (2013.01); *E21B 43/24* (2013.01)

(58) Field of Classification Search
CPC .......... C09K 8/592; C09K 8/584; E21B 43/24

USPC .......................................................... 166/303
See application file for complete search history.

(56) References Cited

U.S. PATENT DOCUMENTS

| | | | |
|---|---|---|---|
| 3,885,626 A | 5/1975 | Gale et al. | |
| 4,088,190 A | 5/1978 | Fischer et al. | |
| 4,426,303 A | 1/1984 | Nuckels et al. | |
| 4,540,049 A | 9/1985 | Hawkins et al. | |
| 4,814,096 A | 3/1989 | Evani | |
| 5,005,644 A * | 4/1991 | Wall | C09K 8/592 166/309 |
| 5,052,487 A * | 10/1991 | Wall | E21B 43/24 166/272.3 |
| 5,325,920 A | 7/1994 | Djabbarah | |
| 5,333,687 A | 8/1994 | Osterloh | |
| 8,950,494 B2 * | 2/2015 | Nguyen | E21B 43/12 507/135 |
| 2009/0078414 A1 | 3/2009 | Horvath et al. | |
| 2018/0037809 A1 | 2/2018 | Frattarelli et al. | |
| 2019/0233717 A1* | 8/2019 | Mukherjee | C09K 8/584 |
| 2020/0231862 A1 | 7/2020 | Knight et al. | |

FOREIGN PATENT DOCUMENTS

| | | |
|---|---|---|
| AU | 2015231341 B2 | 1/2019 |
| CA | 2013514 A1 | 9/1990 |
| EP | 0032072 A1 | 7/1981 |

OTHER PUBLICATIONS

Copy of PCT/US2020/054731, mailed Jan. 28, 2021 (12 pgs).
Copy of PCT/US2020/054731, mailed Apr. 21, 2022 (8 pgs).

* cited by examiner

*Primary Examiner* — William D Hutton, Jr.
*Assistant Examiner* — Ashish K Varma
(74) *Attorney, Agent, or Firm* — Brooks, Cameron & Huebsch, PLLC

(57) ABSTRACT

Embodiments of the present disclosure are directed towards methods of enhanced oil recovery from a subterranean reservoir, the method includes co-injecting a gas and a foam formulation into the subterranean reservoir, wherein the gas comprises steam and the foam formulation comprises a sulfonate composition, a glycol compound, and water.

7 Claims, No Drawings

ENHANCED OIL RECOVERY METHODS AND COMPOSITIONS

This application is a National Stage Application under 35 U.S.C. § 371 of International Application Number PCT/US2020/054731, filed Oct. 8, 2020 and published as WO 2021/072043 on Apr. 15, 2021, which claims the benefit to U.S. Provisional Application 62/913,222, filed Oct. 10, 2019, the entire contents of which are incorporated herein by reference in its entirety.

FIELD OF DISCLOSURE

Embodiments of the present disclosure are directed towards enhanced oil recovery, more specifically, embodiments are directed towards enhanced oil recovery methods and compositions that include steam and a foam formulation a sulfonate composition, a glycol compound, and water.

BACKGROUND

Oil production from oil reservoirs can be considered to have a number of phases, e.g., a primary phase, a secondary phase, and a tertiary phase that may be referred to as Enhanced Oil Recovery (EOR). The primary phase may utilize the natural pressure of the oil reservoir and/or gravity to drive oil to a production wellbore where a lift technique, such as pumping, may be utilized to bring oil to the surface. The secondary phase may utilize water and/or gas injection to displace oil and drive it to a production wellbore. The tertiary phase may utilize one or more methods, such as the introduction of heat to the oil reservoir, injection of gas to push additional oil to the production wellbore and/or dissolve in the oil to lower its viscosity, injection of chemicals to help lower the surface tension of the oil. Any of these phases may initiated at any time during the productive life of an oil reservoir. There is continued focus in the industry on developing new and improved materials and/or methods that may be utilized for oil production.

SUMMARY

The present disclosure provides methods of enhanced oil recovery from a subterranean reservoir, the method includes co-injecting a gas and a foam formulation into the subterranean reservoir, wherein the gas comprises steam and the foam formulation comprises a sulfonate composition, a glycol compound, and water.

The present disclosure provides enhanced oil recovery composition including steam and a foam formulation including a sulfonate composition, a glycol compound, and water.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Enhanced oil recovery compositions and methods are disclosed herein. The enhanced oil recovery compositions include a foam formulation and steam. Surprisingly, the sulfonate compositions and glycol compounds, which are included in the foam formulations disclosed herein, show an unexpected synergy for properties of foams that are made from the foam formulations. For instance, the foam formulations including the sulfonate composition and the glycol compound may advantageously provide improved, i.e. greater, foam heights as compared to other foam formulations that do not include both the sulfonate composition and the glycol compound. Additionally, the foam formulations including the sulfonate composition and the glycol compound may advantageously provide improved, i.e. lesser, rates of foam height reduction as compared to other foam formulations that do not include both the sulfonate composition and the glycol compound. The enhanced oil recovery compositions and methods disclosed herein can provide benefits such as, an injected foam formulation can foam for a longer period of time and block the high permeable zones in the reservoir, as compared to other compositions and methods. This foam can help to redirect steam to oil-rich reservoir zones, increase apparent viscosity, and/or reduce steam channeling; all of which can provide improved oil recovery, for instance.

The foam formulations disclosed herein may desirably form stable foams at elevated temperatures, e.g. temperatures above 150° C. Forming stable foams at elevated temperatures is advantageous for a number of enhanced oil recovery applications, e.g. steam flooding.

The foam formulations disclosed herein include a sulfonate composition. The sulfonate composition includes a first sulfonate of the following Formula I:

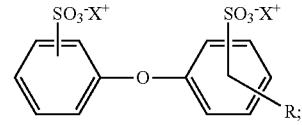

and one or more of:
a second sulfonate of the following Formula II:

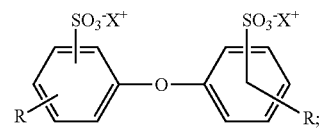

a third sulfonate of the following Formula III:

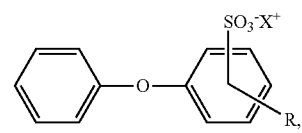

and
a fourth sulfonate of the following Formula IV:

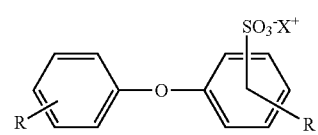

wherein each R is a $C_3$ to $C_{24}$ alkyl group and each X is H, an alkali metal, an alkaline earth metal, a divalent metal, or ammonium. One or more embodiments provide that each R is a $C_6$ to $C_{16}$ alkyl group. One or more embodiments provide that each R is a $C_{12}$ to $C_{18}$ alkyl group. One or more embodiments provide that each R is a $C_{16}$ alkyl group. One or more embodiments provide that each X is a monovalent or divalent cation, such as calcium or magnesium, among others. One or more embodiments provide that each X a sodium ion, a potassium ion, a lithium ion, or an ammonium ion. Examples of ammonium ions include, but are not limited to, ammonium, methyl ammonium, ethyl ammonium, dimethyl ammonium, methylethyl ammonium, trimethyl ammonium, dimethylbutyl ammonium, hydroxylethyl ammonium, and methylhydroxyethyl ammonium.

The first sulfonate, the second sulfonate, the third sulfonate, and the fourth sulfonate are anionic compounds. As such, the sulfonate composition may be referred to as an anionic composition. Anionic compounds and/or anionic compositions are desirable for a number of enhanced oil recovery applications.

The sulfonate composition can be made by a known process, e.g. by using known components, known equipment, and known reaction conditions. The sulfonate composition can be obtained commercially.

The first sulfonate is from 50 weight percent to 99 weight percent of the sulfonate composition based upon a total weight of the first sulfonate, the second sulfonate, the third sulfonate, and the fourth sulfonate. All individual values and subranges from 50 weight percent to 99 weight percent are included; for example the first sulfonate can be from a lower limit of 50, 65, or 70 weight percent to an upper limit of 99, 85, or 80 weight percent based upon the total weight of the first sulfonate, the second sulfonate, the third sulfonate, and the fourth sulfonate. One or more embodiments provide that the first sulfonate is from 74 weight percent to 84 weight percent of the sulfonate composition based upon the total weight of the first sulfonate, the second sulfonate, the third sulfonate, and the fourth sulfonate, or from 76 weight percent to 82 weight percent of the sulfonate composition based upon the total weight of the first sulfonate, the second sulfonate, the third sulfonate, and the fourth sulfonate.

The second sulfonate can be from 0 weight percent to 50 weight percent of the sulfonate composition based upon the total weight of the first sulfonate, the second sulfonate, the third sulfonate, and the fourth sulfonate. All individual values and subranges from 0 weight percent to 50 weight percent are included; for example the second sulfonate can be from a lower limit of 0, 5, or 10 weight percent to an upper limit of 50, 35, 25, or 15 weight percent based upon the total weight of the first sulfonate, the second sulfonate, the third sulfonate, and the fourth sulfonate. One or more embodiments provide that the second sulfonate is from 8 weight percent to 16 weight percent of the sulfonate composition based upon the total weight of the first sulfonate, the second sulfonate, the third sulfonate, and the fourth sulfonate, or from 10 weight percent to 14 weight percent of the sulfonate composition based upon the total weight of the first sulfonate, the second sulfonate, the third sulfonate, and the fourth sulfonate.

The third sulfonate can be from 0 weight percent to 50 weight percent of the sulfonate composition based upon the total weight of the first sulfonate, the second sulfonate, the third sulfonate, and the fourth sulfonate. All individual values and subranges from 0 weight percent to 50 weight percent are included; for example the third sulfonate can be from a lower limit of 0, 3, or 5 weight percent to an upper limit of 50, 35, 25, or 10 weight percent based upon the total weight of the first sulfonate, the second sulfonate, the third sulfonate, and the fourth sulfonate. One or more embodiments provide that the third sulfonate is from 3 weight percent to 11 weight percent of the sulfonate composition based upon the total weight of the first sulfonate, the second sulfonate, the third sulfonate, and the fourth sulfonate, or from 5 weight percent to 9 weight percent of the sulfonate composition based upon the total weight of the first sulfonate, the second sulfonate, the third sulfonate, and the fourth sulfonate.

The fourth sulfonate can be from 0 weight percent to 50 weight percent of the sulfonate composition based upon the total weight of the first sulfonate, the second sulfonate, the third sulfonate, and the fourth sulfonate. All individual values and subranges from 0 weight percent to 50 weight percent are included; for example the fourth sulfonate can be from a lower limit of 0, 1, or 2 weight percent to an upper limit of 50, 35, 25, 15, or 5 weight percent based upon the total weight of the first sulfonate, the second sulfonate, the third sulfonate, and the fourth sulfonate. One or more embodiments provide that the fourth sulfonate is from 0.5 weight percent to 6 weight percent of the sulfonate composition based upon the total weight of the first sulfonate, the second sulfonate, the third sulfonate, and the fourth sulfonate, or from 1 weight percent to 4 weight percent of the sulfonate composition based upon the total weight of the first sulfonate, the second sulfonate, the third sulfonate, and the fourth sulfonate.

The foam formulations disclosed herein include a glycol compound. As used herein a "glycol compound" refers to glycols and derivatives thereof. The glycol compound can be represented by the following formula:

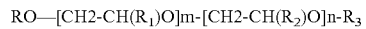

$$RO-[CH2-CH(R_1)O]m-[CH2-CH(R_2)O]n-R_3$$

where R, $R_1$, $R_2$, and $R_3$ are each independently H, an alkyl group, a phenyl group, or an alkyl phenyl group m is an integer from 0 to and n is an integer from 1 to 3.

R, $R_1$, $R_7$, and $R_3$ may each independently include from 4 to 12 carbons. As mentioned, R, $R_1$, $R_2$, and $R_3$ may each independently be an alkyl group. R, $R_1$, $R_2$, and $R_3$ may be the same alkyl group or different alkyl groups. The alkyl group may be linear, branched, or cyclic. One or more embodiments provide that n is 1 and R, $R_1$, $R_2$, and $R_3$ are each independently selected from H, methyl, butyl, hexyl or 2-ethylhexyl.

The glycol compound can be made by a known process, e.g. by using known components, known equipment, and known reaction conditions. The glycol compound can be obtained commercially. Examples of the glycol compound include, but are not limited to, ethylene glycol, diethylene glycol, triethylene glycol, diethylene glycol ethyl ether, ethylene glycol monobutyl ether, ethylene glycol monobutyl ether, diethylene glycol monobutyl ether, diethylene glycol methyl ether, and combinations thereof, among others.

The foam formulations disclosed herein include water. As used herein, the term "water" can include, for example, a brine, a connate water, surface water, distilled water, carbonated water, sea water, and combinations thereof.

Embodiments of the present disclosure provide that the sulfonate composition is from 0.01 weight percent to 35 weight percent of the foam formulation based upon a total weight of the sulfonate composition, the glycol compound, and the water. All individual values and subranges from 0.01 weight percent to 35 weight percent are included; for example the sulfonate composition can be from a lower limit of 0.01, 0.1, or 0.3 weight percent to an upper limit of 35, 25, 15, 5, or 2 weight percent based upon the total weight of the sulfonate composition, the glycol compound, and the water.

Embodiments of the present disclosure provide that the glycol compound is from 0.01 weight percent to 35 weight percent of the foam formulation based upon a total weight of the sulfonate composition, the glycol compound, and the water. All individual values and subranges from 0.01 weight percent to 35 weight percent are included; for example the glycol compound can be from a lower limit of 0.01, 0.1, or 0.5 weight percent to an upper limit of 35, 25, 15, 5, or 2 weight percent based upon the total weight of the sulfonate composition, the glycol compound, and the water.

Embodiments of the present disclosure provide that water is from 30 weight percent to 99.98 weight percent of the foam formulation based upon a total weight of the sulfonate composition, the glycol compound, and the water. All individual values and subranges from 85 weight percent to 99.8 weight percent are included; for example water can be from a lower limit of 30, 60, 90, or 95 weight percent to an upper limit of 99.98, 99.90, 98.95, or 98.75 weight percent based upon the total/eight of the sulfonate composition, the glycol compound, and the water.

The foam formulations disclosed herein can be made can be made by a known process, e.g. by using known equipment and known conditions. For example, the sulfonate composition, the glycol compound, and the water may be combined, e.g. mixed, to make the foam formulation. The sulfonate composition, the glycol compound, and the water may be combined in any order.

The foam formulations disclosed herein may be utilized with a noncondensible gas. The noncondensible gas may assist in foam generation. The noncondensible gas may be injected into the subterranean reservoir simultaneously and/or sequentially with the foam formulation. Examples of the noncondensible gas include, but are not limited to air, oxygen, hydrogen, nitrogen, helium, methane, carbon dioxide, carbon monoxide, hydrogen sulfide, propane, butane, natural gas, flue gas and combinations thereof, among others. Gases may come in the form of a gas/liquid mixture; including natural gas liquids containing propane, butane, pentane, and hexane. One or more embodiments of the present disclosure provide that the noncondensible gas is nitrogen. Various amounts of the noncondensible gas may be utilized for different applications.

The foam formulations disclosed herein may be utilized with an additive. Examples of additives include, but are not limited to, nonionic surfactants, ionic surfactants, anionic surfactants, cationic surfactants, corrosion inhibitors, scale inhibitors, antioxidants, alcohols, foaming agents, and combinations thereof. Various amounts of additive may be utilized for various applications. For instance, one or more embodiments provide that the additive is 5 weight percent or less based upon a total weight of the additive, the sulfonate composition, the glycol compound, and the water.

Enhanced oil recovery compositions including the foam formulations and steam are disclosed herein. Steam, when injected into a subterranean reservoir, may form a finger or channel such that the steam undesirably bypasses portions of subterranean reservoir. However, the enhanced oil recovery compositions can be utilized to form foams that can advantageously reduce the steam from bypassing portions of subterranean reservoir. Various amounts of steam may be utilized for different applications, e.g., different subterranean reservoirs.

Embodiments of the present disclosure provide methods of enhanced oil recovery from a subterranean reservoir. The methods of enhanced oil recovery include injecting a gas and a foam formulation into the subterranean reservoir, wherein the gas comprises steam. Injecting the gas, i.e. steam, into the subterranean reservoir may be referred to as steam injection. The steam may be injected into the subterranean reservoir simultaneously and/or sequentially with the foam formulation. Various amounts of steam may be utilized for different applications, e.g., different subterranean reservoirs.

One or more embodiments of the present disclosure provide that injecting the gas, i.e., the steam, and the foam formulation occurs at a temperature equal to or above 150° C. For instance, injecting the gas and the foam formulation can occur at a temperature range from 150° C. to 300° C., 175° C. to 275° C., or 185° C. to 250° C. This temperature may be in-situ and/or ex-situ. For instance, the gas and foam formulation may be heated to a temperature equal to or above 150° C. prior to be injected into the subterranean reservoir; the gas and foam formulation may be heated to a temperature equal to or above 150° C. while to be injected into the subterranean reservoir; and/or the gas and foam formulation may be heated to a temperature equal to or above 150° C. within the subterranean reservoir. As mentioned, the foam formulations disclosed herein may desirably form stable foams at elevated temperatures, e.g. temperatures equal to or above 150° C. Forming stable foams at elevated temperatures is advantageous for a number of enhanced oil recovery applications, e.g. steam flooding.

One or more embodiments of the present disclosure provide that one or more additional components may be utilized with the methods and/or compositions disclosed herein. Additional components are known in the field of enhanced oil recovery. Various amounts of additional components may be utilized for various applications.

EXAMPLES

In the Examples, various terms and designations for materials are used including, for instance, the following:

Ethylene glycol (glycol compound; obtained from Fisher Scientific);

Diethylene glycol monobutyl ether (glycol compound; obtained from The Dow Chemical Company);

Sulfonate composition 1 was made by the alkylation of diphenyl oxide (DPO) to provide an alkylated product, followed by sulfonation of the alkylated product, and then neutralization utilizing a caustic solution. Alkylation of DPO with specified olefin length was carried out in the presence of aluminum chloride catalyst between 50° C. and 100° C. The Friedel-Crafts alkylation reaction was carried out in the presence of excess DPO to control relative amounts of mono-, di-, and higher poly-alkylates from competitive reactions of olefins around the aromatic rings. The aluminum chloride catalyst was neutralized by the addition of sodium hydroxide solution, and the alkylated product was isolated by distillation. Sulfur trioxide was then added to the distilled alkylated product to generate the sulfonated products. The exothermic sulfonation reaction was maintained at isothermal conditions at or below room temperature. Following sulfonation, unreacted S03 was removed by the addition of water. Caustic soda was then added to neutralize the aqueous acid solution to generate sulfonate composition 1 having a pH of equal to or greater than 7.

Sulfonate composition 1 was a sulfonate composition comprising: a sulfonate of Formula I (79 weight percent), a sulfonate of Formula II (12 weight percent), a sulfonate of Formula III (7 weight percent), and a sulfonate of Formula IV (2 weight percent), where R is $C_{16}$ alkyl group and X is sodium);

Sulfonate composition 2 was made similarly to sulfonate composition 1. Sulfonate composition 2 was a sulfonate composition comprising: a sulfonate of Formula I (79 weight percent), a sulfonate of Formula II (12 weight percent), a sulfonate of Formula III (7 weight percent), and a sulfonate of Formula IV (2 weight percent), where R is $C_{12}$ alkyl group and X is sodium);

Example 1, a foam formulation, was prepared as follows. Sulfonate composition 1, ethylene glycol, and water were combined by mixing. The amounts utilized for Example 1 are reported in Table 1.

Examples 24, foam formulations, were prepared as Example 1 with the components and amounts reported in Table 1,

TABLE 1

|  | Example 1 | Example 2 | Example 3 | Example 4 |
|---|---|---|---|---|
| Sulfonate composition 1 (weight percent) | 0.50 | 0.50 | 0.50 | 0.50 |
| Ethylene glycol (weight percent) | 0.95 | 0.95 | 0.95 | — |
| Butyl Carbitol (weight percent) | — | — | — | 0.95 |
| Water (weight percent) | 98.55 | 98.55 | 98.55 | 98.55 |

Example 1 was utilized to make a foam as follows. A JERGUNSON (19-T-32 series) level gauge was modified with a sparger (Mott—¼"×1" with 410 media grade) and borosilicate glass tube (14 mm OD, 1 mm wall thickness, 305 mm long). Then, the level gauge was pressurized to 950 psi g with air, heated to 150° C., and equilibrated for 3 hours. Example 1 was then pumped into the level gauge at a rate of 10 mL/minute unit to a height of 10 cm and then heated at 150° C. for 1 hour. Then, nitrogen (180 standard cubic centimeters per minute) was pumped into the level gauge to make the foam; the nitrogen flow continued until the foam reached a steady state height or reached the maximum height of the level gauge, whichever happened first. Excess nitrogen pressure was continually bled off through a back-pressure regulator, and deionized water was pumped into the level gauge at a rate of 0.2 mL/min to make up for the losses during nitrogen flow. After the foam reached the steady state height or the level gauge maximum, the nitrogen and deionized water flows were stopped and the foam was allowed to collapse. The foam height was recorded as a function of time. The results are reported in Table 2.

Example 2-4 were utilized to make a foam as Example 1, with the change that Example 2-4 were respectively utilized rather than Example 1. The foam heights were recorded as a function of time. The results are reported in Table 2.

Comparative Examples A-C were performed as Example 1, with the amounts respectively utilized for Comparative Examples A-C reported in Table 2. The foam heights were recorded as a function of time. The results are reported in Table 3.

TABLE 2

|  | Comparative Example A | Comparative Example B | Comparative Example C |
|---|---|---|---|
| Sulfonate composition 1 (weight percent) | 0.50 | — | — |
| Sulfonate composition 2 (weight percent) | — | 0.50 | — |
| Ethylene glycol (weight percent) | — | — | 0.95 |
| Butyl Carbitol (weight percent) | — | — | — |
| Water (weight percent) | 99.50 | 99.50 | 99.05 |

TABLE 3

|  | Foam Height at 100 minutes | Foam Height at 200 minutes | Foam Height at 300 minutes | Foam Height at 400 minutes |
|---|---|---|---|---|
| Example 1 | 21.0 cm | 15.0 cm | 15.0 cm | 15.0 cm |
| Example 2 | 20.0 cm | 15.0 cm | 14.0 cm | Not measured |
| Example 3 | 20.0 cm | 14.0 cm | 14.0 cm | 6.0 cm |
| Example 4 | 16.5 cm | 15.0 cm | 7.0 cm | 7.0 cm |
| Comparative Example A | 11.0 cm | 5.7 cm | Not measured | Not measured |
| Comparative Example B | 4.0 cm | 2.5 cm | 1.3 cm | 0.5 cm |
| Comparative Example C | 3.0 cm | Not measured | Not measured | Not measured |

The data of Table 3 illustrates that each of Examples 1-4 had an improved, i.e. greater, foam height for measured values at 100 minutes, 200 minutes, 300 minutes, and 400 minutes as compared to each of Comparative Examples A-C.

The rate of foam height reduction, i.e. the rate of foam collapse, for Examples 1-4 and Comparative Examples A-B are reported in Table 4.

TABLE 4

|  | Rate of foam height reduction determined at 100 minutes | Rate of foam height reduction determined at 200 minutes | Rate of foam height reduction determined at 300 minutes | Rate of foam height reduction determined at 400 minutes |
|---|---|---|---|---|
| Example 1 | 0 cm/min | 0.030 cm/min | 0.020 cm/min | 0.015 cm/min |
| Example 2 | 0 cm/min | 0.025 cm/min | 0.020 cm/min | Not measured |
| Example 3 | 0 cm/min | 0.030 cm/min | 0.020 cm/min | 0.035 cm/min |
| Example 4 | 0.035 cm/min | 0.025 cm/min | 0.043 cm/min | 0.032 cm/min |
| Comparative Example A | 0.089 cm/min | 0.071 cm/min | Not measured | Not measured |

TABLE 4-continued

|  | Rate of foam height reduction determined at 100 minutes | Rate of foam height reduction determined at 200 minutes | Rate of foam height reduction determined at 300 minutes | Rate of foam height reduction determined at 400 minutes |
|---|---|---|---|---|
| Comparative Example B | 0.160 cm/min | 0.087 cm/min | 0.062 cm/min | 0.049 cm/min |
| Comparative Example C | 0.169 cm/min | Not measured | Not measured | Not measured |

The data of Table 4 illustrates that each of Examples 1-4 had an improved, i.e. lesser, rate of foam height reduction for measured values determined at 100 minutes, 200 minutes, 300 minutes, and 400 minutes as compared to each of Comparative Examples A-C where foams were present.

What is claimed is:

1. A method of enhanced oil recovery from a subterranean reservoir, the method comprising:
co-injecting a gas and a foam formulation into the subterranean reservoir, wherein the gas comprises steam and the foam formulation comprises:
a sulfonate composition comprising:
a first sulfonate of Formula I:

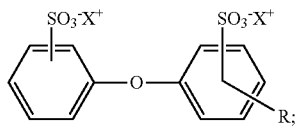

and one or more of
a second sulfonate of Formula II:

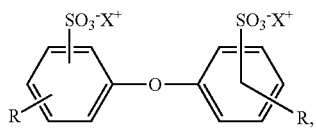

a third sulfonate of Formula III:

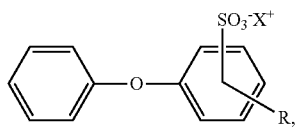

and
a fourth sulfonate of Formula IV:

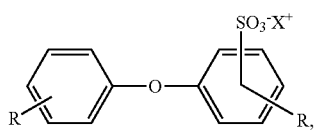

wherein R is a $C_3$ to $C_{24}$ alkyl group and X is H, an alkali metal, an alkaline earth metal, a divalent metal, or ammonium; and
a glycol compound having a formula:

RO—[CH2-CH($R_1$)O]m-[CH2-CH($R_2$)O]n-$R_3$ where R, $R_1$, $R_2$, and $R_3$ are each independently H, an alkyl group, a phenyl group, or an alkyl phenyl group; m is an integer from 0 to 3; and n is an integer from 1 to 3; and
water.

2. The method of claim 1, wherein the first sulfonate is from 50 weight percent to 99 weight percent of the sulfonate composition based upon a total weight of the first sulfonate, the second sulfonate, the third sulfonate, and the fourth sulfonate; the second sulfonate is from 0 weight percent to 50 weight percent of the sulfonate composition based upon the total weight of the first sulfonate, the second sulfonate, the third sulfonate, and the fourth sulfonate; the third sulfonate is from 0 weight percent to 50 weight percent of the sulfonate composition based upon the total weight of the first sulfonate, the second sulfonate, the third sulfonate, and the fourth sulfonate; and the fourth sulfonate is from 0 weight percent to 50 weight percent of the sulfonate composition based upon the total weight of the first sulfonate, the second sulfonate, the third sulfonate, and the fourth sulfonate.

3. The method of claim 1, wherein the sulfonate composition is from 0.01 weight percent to 35 weight percent of the foam formulation based upon a total weight of the sulfonate composition, the glycol compound, and the water.

4. The method of claim 1, wherein the glycol compound is from 0.01 weight percent to 35 weight percent of the foam formulation based upon the total weight of the sulfonate composition, the glycol compound, and the water.

5. The method of claim 1, wherein the water is from 30 weight percent to 99.98 weight percent of the foam formulation based upon the total weight of the sulfonate composition, the glycol compound, and the water.

6. The method of claim 1, wherein co-injecting the gas and the foam formulation into the subterranean reservoir occurs at a temperature from 150° C. to 300° C.

7. An enhanced oil recovery composition comprising:
steam; and
a foam formulation comprising:
a sulfonate composition comprising:
a first sulfonate of Formula I:

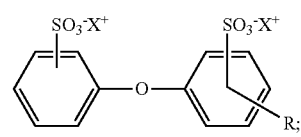

and one or more of
a second sulfonate of Formula II:

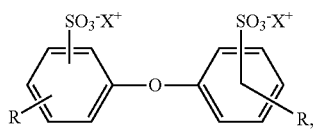

a third sulfonate of Formula III:

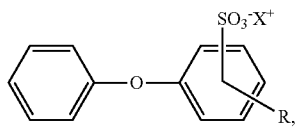

and
a fourth sulfonate of Formula IV:

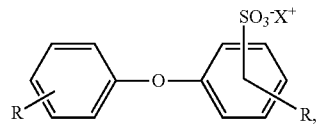

wherein R is a $C_3$ to $C_{24}$ alkyl group and X is H, an alkali metal, an alkaline earth metal, a divalent metal, or ammonium; and a glycol compound having a formula:

RO—[CH2-CH($R_1$)O]m-[CH2-CH($R_2$)O]n-$R_3$ where R, $R_1$, $R_2$, and $R_3$ are each independently H, an alkyl group, a phenyl group, or an alkyl phenyl group; m is an integer from 0 to 3; and n is an integer from 1 to 3; and water.

* * * * *